J. Swartz.
Mower.
Nº 11951 — Patented Nov. 14, 1854.
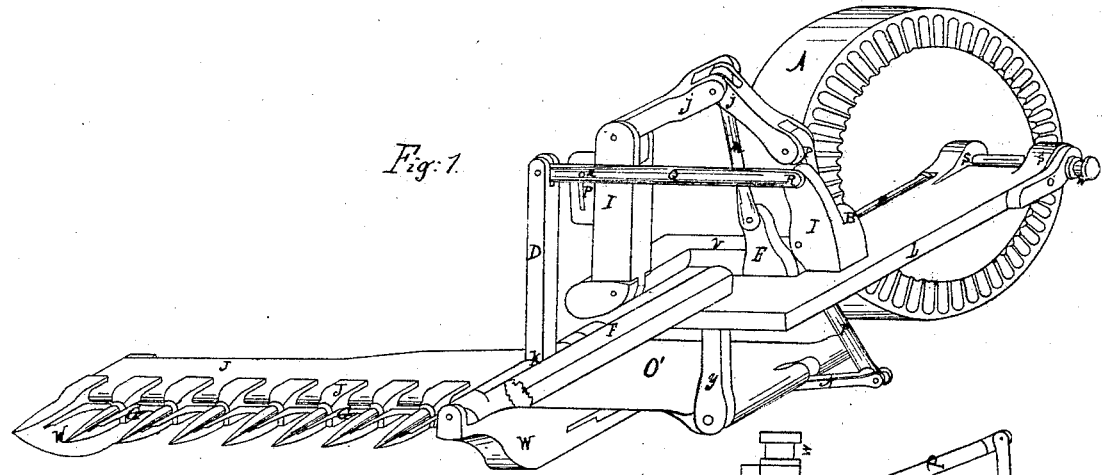
Fig: 1.
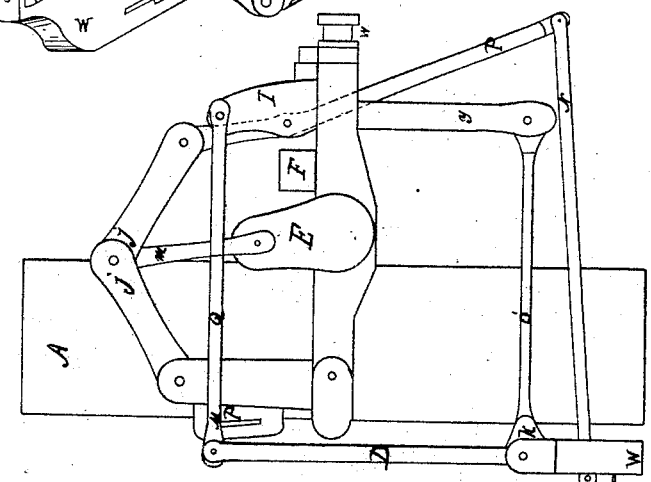
Fig: 2.
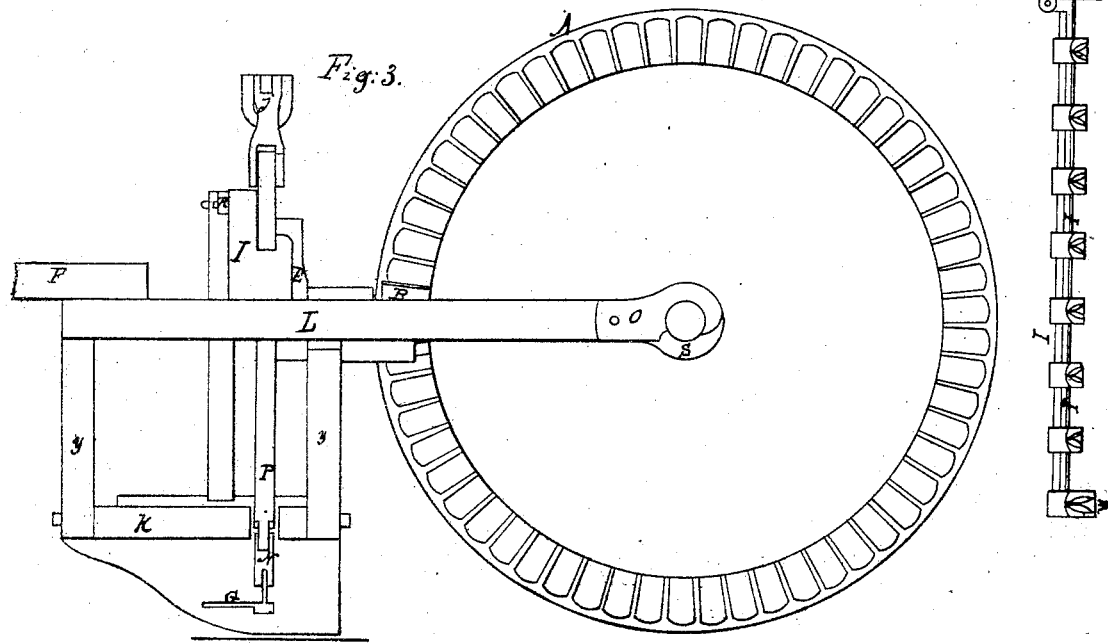
Fig: 3.

UNITED STATES PATENT OFFICE.

JACOB SWARTZ, OF BUFFALO, NEW YORK.

IMPROVEMENT IN MOWING AND REAPING MACHINES.

Specification forming part of Letters Patent No. 11,951, dated November 14, 1854.

*To all whom it may concern:*

Be it known that I, JACOB SWARTZ, of the city of Buffalo, in the county of Erie and State of New York, have invented certain new and useful Improvements in Mowing and Reaping Machines; and I do hereby declare the following to be a full, clear, and exact description of the same, reference being had to the accompanying drawings, making a part thereof, in which—

Figure 1 represents a perspective view of the machine. Fig. 2 represents a front elevation, and Fig. 3 represents a view from one of the sides of the machine.

Similar letters in the same figures denote like parts.

The nature of my invention relates to the combination of devices for obtaining four reciprocating movements of the cutter-bar to every revolution of the pinion; also, to the hinging of the guard-tooth bar to the frame in such manner as that it may be adjusted vertically when cutting grain, and follow by its own weight the undulations of the ground when cutting grass, and be self-adjusting independently of the supporting or carrying wheel as it passes along; also, in the manner of supporting the frame of the machine upon the axle of the main carrying and driving wheel, so that it may, at pleasure, be held in or out of gear with the pinion, as the machine may be working or being moved from place to place preparatory to its being put into operation.

To enable others skilled in the art to make and use my invention, I will proceed to describe the same with reference to the drawings.

$a$ represents the main carrying and driving wheel, suitably provided with beveled cog-gear to mesh with and drive a bevel-pinion, B, on a shaft, $c$, supported in bearings in the side bar or frame, L. On the end of the shaft $c$ is a crank, E, and to a wrist-pin therein is attached by one of its ends a pitman or connecting-rod, $m$, the other end of which is hinged to the toggle-levers $j\,j$, so as to form therewith a toggle-joint. To one of these toggle-levers $j$ is pivoted or hinged one end of a vibrating lever, P, the other end being similarly connected with a rod, N, for working the cutter-bar G. The lever P has its fulcra in the upright T. The cutter-bar G is supported in guard-fingers in the usual way on the guard-bar J, and said bar J is in turn hinged at $k$, so as to rise and fall with a parallel motion.

Y is a suspended arm, to which a horizontal piece, O', is hinged, it being also hinged at $k$, where the cutter and guide bar are also hinged.

D is a rigid upright bar, to the top of which is pivoted a cross-bar, Q, the other end thereof being pivoted at R to the upright T. On the side of the frame is placed a guide-piece, with a curved slot, $p$, therein, in which a set-screw pin, $u$, passing through the cross-bar Q works, this being for the double purpose of raising and holding up the cutter-bar at a suitable height for cutting grain, and for allowing said cutters and bar to rise and fall with a parallel motion when cutting grass, and to conform to the natural undulations of the ground regardless of the points over which the wheel $a$ rolls. W are guides or runners at each end of the cutter-bar frame, to keep the fingers above the ground.

On rear of the frame L are suitable boxes, $s\,s$, through which the axle, permanently attached to the wheel $a$, so as to turn with it, passes, and connected to the outside of the frame is a latch, O, which catches over suitable grooves in the end of the axle, and holds the pinion B in or out of gear with the main wheel, as the case may be.

The primary advantage of this machine is its adaptability to the cutting of both grain or grass; and when used in this latter capacity, its rising and falling in parallel iines, or self-adjustability to the natural inequalities of the ground, makes a very desirable agricultural implement.

The draft-bar or tongue F may be placed on either side of or in line with the driving-wheel, whichever may be desirable or will best conduce to the balancing or tracking of the machine.

Having thus fully described the nature of my invention, what I claim therein as new, and desire to secure by Letters Patent, is—

1. The application, to the driving or vibrating mechanism of the cutter-bar, of the crank E, pitman m, toggle-levers j j, hinged lever P, and rod N, for the purpose of giving four reciprocating motions to the cutter-bar for every revolution of the crank-shaft, substantially as described.

2. So hinging the cutter and guard-tooth bar to the machine by means of the hinged pieces O' and Q as that it may rise and fall in parallel lines, whether used for cutting grain or grass, substantially as described.

JACOB SWARTZ.

Witnesses:
G. W. SWARTZ,
A. S. SWARTZ.